Nov. 3, 1925.  1,560,222
S. ELIOT
COMBINATION WHEEL AND PUNCTURE PROOF TIRE
Filed April 7, 1921

Inventor:
Samuel Eliot,
by J. H. McCurdy
his atty.

Patented Nov. 3, 1925.

1,560,222

UNITED STATES PATENT OFFICE.

SAMUEL ELIOT, OF MANCHESTER, MASSACHUSETTS.

COMBINATION WHEEL AND PUNCTUREPROOF TIRE.

Application filed April 7, 1921. Serial No. 459,314.

*To all whom it may concern:*

Be it known that I, SAMUEL ELIOT, a citizen of the United States, residing at Manchester, in the county of Essex and State of Massachusetts, have invented certain new and useful Improvements in Combination Wheels and Punctureproof Tires, of which the following is a specification.

This invention relates to vehicle wheels and is especially concerned with a wheel having a resilient tire designed with particular reference to the requirements of automobiles, trucks, and the like.

It is recognized by those skilled in this art that while a pneumatic tire provides the easiest riding tread so far devised it is, nevertheless, a source of great annoyance due to its liability to puncture. The present invention aims to devise a tire construction which, while possessing the easy riding qualities of a pneumatic tire, shall not be subject to the objection just mentioned. It is also an object of the invention to combine a wheel, preferably of the disk type, with a puncture proof resilient tire.

The nature of the invention will be readily understood from the following description when read in connection with the accompanying drawings, and the novel features will be particularly pointed out in the appended claims.

Referring now to the drawings.

Figure 3:
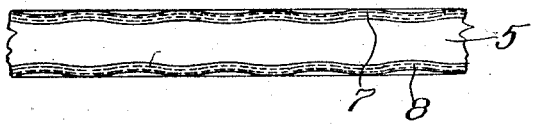
Fig. 3 is a development of a portion of the edge of the wheel without the rim.
Figure 1:
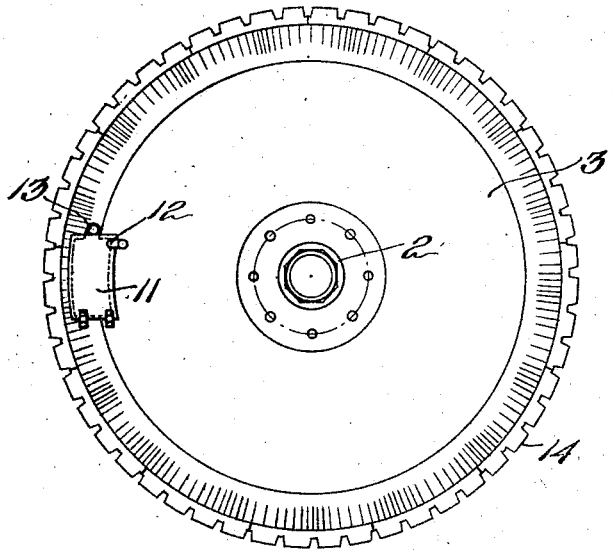
Figure 1 is a side elevation of a wheel constructed in accordance with the present invention.
Figure 2:
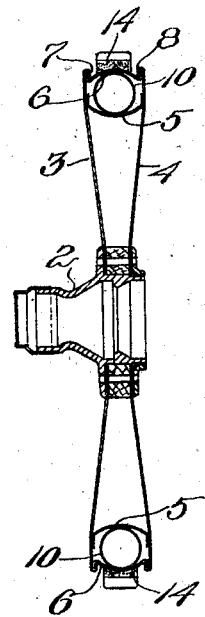
Fig. 2 is a vertical cross sectional view of the wheel shown in Fig. 1.

The wheel shown comprises a hub 2 to which are secured two annular plates 3 and 4, respectively. Near their outer edges these plates are connected by a transverse annular member 5. Usually the disk-like plates 3 and 4 are made of steel and the transverse member 5 also is made of steel and is provided with flanges, as shown, which are riveted or welded to the members 3 and 4. Between the outer edges of the plates 3 and 4 is a resilient rim member 6 having a marginal flange at each side thereof, and the edges of the plates 3 and 4 are turned inwardly, as indicated at 7 and 8, to form grooves in which the flanges of the rim are located. The rim 6 preferably is made of spring steel of such a thickness as to have sufficient resiliency to yield freely when it strikes a stone or other obstruction in the road, and this member is supported by a pneumatic tube 10 which encircles the transverse member 5.

This tube should be considerably more substantial in construction than the ordinary inner tube used in an automobile tire or shoe, but does not need to be as heavy as an automobile shoe. The size and structure of the tube of course should be suited to the weight of the car on which the wheel is to be used. Usually it should be of about the thickness of the wall of an ordinary automobile shoe or casing, and it may be either of the continuous type or it may have ends which can be overlapped within the chamber provided between the plates 3 and 4 and the members 5 and 6. When a tube of the latter character is to be used I prefer to provide an opening in the disk 3 for the introduction or removal of the tube, and to close this opening normally by a door 11 which may be retained in its closed position by any convenient form of latch, such as that indicated at 12. A notch is formed in one edge of the opening to receive the valve stem 13 which projects laterally from the pneumatic tube 10.

Figure 5:
Figs. 5 and 6 are cross sectional views showing different types of tread constructions that may be employed.
Figure 6:

A tread member 14 preferably consisting of blocks or sections of rubber is secured to the rim 6. This tread may be mounted on the rim in any one of several ways, two methods of attachment being illustrated in the drawings. In Fig. 5 the tread members 14 are provided with integral lugs 15 of a dove-tail shape and these lugs are forced through holes formed in the rim to receive them. In the construction shown in Fig. 6 each of the tread blocks 14 has a headed stud 16 embedded in it and the shank of this stud is located in a hole in the rim 6 and is headed or riveted over. Any other convenient attaching means may, however, be employed.

It will now be evident that since the rim 6 is supported by the pneumatic tube 10 and since this rim is made of resilient material, it can yield readily to irregularities in the road, so that this construction possesses the easy riding qualities of the ordinary pneumatic tire. At the same time the pneumatic tube 10 is protected by the metal enclosure in which it is located from any possibility of puncture by contact with parts external to the wheel, the only liability of puncturing being due to wear caused by its contact with the metal parts in which it is enclosed. This wear, however, is very slow. Even if a tube should be punctured it would be entirely possible to ride for a long distance without injuring the tube, since the rim 6 would be pressed inwardly by its contact with the road until the shoulders at opposite edges thereof rested on the shoulders of the transverse member 5. The road contacting face of the tread 14 would still project beyond the peripheral edges of the disks 3 and 4 so that the wheel would simply be running on a solid tire.

Figure 4:
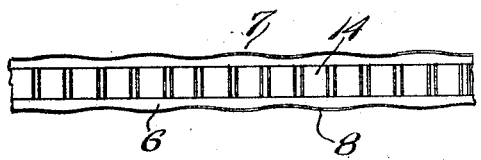
Fig. 4 is a view similar to Fig. 3 but including the rim and tread.

There is a certain tendency for the rim 6 and the tread 14 to creep circumferentially between the disks 3 and 4, and in order to prevent this tendency the marginal portions of the disks 3 and 4 and the flanges of the rim are corrugated, as clearly shown in Figs. 3 and 4. These corrugations do not interfere with the radial movement of the rim 6 between the disks but simply prevents any relative circumferential movement between these parts.

It is also pointed out that the transverse connecting member 5 may be made of about the same thickness of stock as that from which the rim 6 is made so that when the tread 14 strikes a stone or other obstruction in the road the inward movement of the rim will be transmitted to the member 5 through the tube 10, producing an inward springing or bulging of the part 5 which will draw the marginal portions of the disks 3 and 4 more closely together against the opposite edges of the rim 6.

It will now be understood that this invention provides a very simple and neat construction in which the advantages of the disk type of wheel are combined with those of a puncture proof pneumatic tire. Spare rims with their treads can be rolled up into a compact package and carried in the car, this rim being in the form of a strip rather than of an endless or annular construction. A worn out rim can easily be replaced by a new one. If a tube should become punctured it can be removed through the opening that is normally closed by the cover plate 11 and a new tube inserted through the same opening.

It will also be understood that while I have herein shown and described the best embodiment of the invention of which I am at present aware, this embodiment may be modified in many particulars without departing from the spirit or scope of this invention.

What is claimed as new is:

1. A vehicle wheel of the character described comprising a pair of substantially parallel annular plates, a transverse connection between said plates spaced inwardly from the peripheral edges thereof, a pneumatic tube encircling said connection and located between said plates, a resilient rim member positioned between the outer edges of said plates and encircling said tube, said rim member having a connection with said plates enabling it to have a limited radial movement relatively to the plates but held against circumferential movement relatively thereto, and a tread carried by said rim.

2. A vehicle wheel of the character described comprising a pair of substantially parallel annular plates, an annular transverse member connecting said plates at points spaced inwardly from the peripheral edges thereof, a pneumatic tube encircling said member, a resilient rim encircling said tube and positioned between the outer edges of said plates, said rim having an outwardly projecting flange at each edge thereof, the margins of said plates being turned inwardly to provide grooves in which said flanges are positioned, and a tread carried by said rim.

3. A vehicle wheel of the character described comprising a pair of substantially parallel annular plates, an annular resilient transverse member connecting said plates near the outer edges thereof, a pneumatic tube encircling said member, and a resilient rim encircling said tube and supported thereby, said rim being positioned between the outer edges of said plates and connected therewith to enable the rim to have a limited radial movement relatively to the plates but held against circumferential movement relatively thereto.

SAMUEL ELIOT.